(12) United States Patent
Helot et al.

(10) Patent No.: US 6,189,349 B1
(45) Date of Patent: Feb. 20, 2001

(54) SINGLE RETRACTING SECURITY HOOK OF DESKTOP PORT REPLICATOR PROVIDING SECURITY FOR DISSIMILAR MULTIPLE PORTABLE COMPUTERS

(75) Inventors: Jacques H. Helot, San Mateo; Guy E. Lichtenwalter; Masahiko Muranami, both of San Jose; Jaime Segura, Palo Alto, all of CA (US); Gerald W. Steiger, Corvallis, OR (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/321,696

(22) Filed: May 28, 1999

(51) Int. Cl.[7] .............................. E05B 69/00; E05B 73/02
(52) U.S. Cl. ...................................... 70/58; 70/57
(58) Field of Search .................. 70/58, 57; 439/159; 361/686, 684

(56) References Cited

U.S. PATENT DOCUMENTS

| | | | |
|---|---|---|---|
| 4,756,175 | * 7/1988 | Matsushima et al. | 70/57 |
| 5,228,658 | * 7/1993 | Kelley | 70/58 |
| 5,450,271 | * 9/1995 | Fukushima et al. | 70/58 |
| 5,645,261 | * 7/1997 | Glynn | 70/58 |
| 5,836,183 | * 11/1998 | Derman | 70/58 |
| 5,870,281 | * 2/1999 | Kim | 70/58 |
| 5,870,283 | * 2/1999 | Maeda et al. | 70/58 |
| 5,928,017 | 7/1999 | Lan | 439/159 |
| 5,995,366 | * 11/1999 | Howell et al. | 70/57 |
| 6,034,869 | 3/2000 | Lin | 361/686 |
| 6,061,233 | * 5/2000 | Jung | 361/686 |

* cited by examiner

Primary Examiner—Lynne H. Browne
Assistant Examiner—John B. Walsh

(57) ABSTRACT

A security mechanism is provided, for use with portable equipment, such as a "notebook" type portable computer, which is to be coupled for use with stationary equipment, such as a port replicator or docking station. The security mechanism includes locking structures, located in complementary positions on the computer and the port replicator, for engaging each other to prevent theft by removal of the computer from the port replicator. The locking structures on the computer are standardized across a line of different computer models, so that the security mechanism is operative regardless of which of the different computer models is docked. Specifically, the locking structures of the various computers within the line of products are in corresponding positions on the computers, relative to the positions the computers occupy when docked. Therefore, the locking structures engage the same way, regardless of which computer of the line of products is docked. The security mechanism is manipulated by the presence of the computer being docked, so that the user is not required to manipulate the security mechanism separately from docking the computer.

3 Claims, 6 Drawing Sheets

SINGLE RETRACTING SECURITY HOOK OF DESKTOP PORT REPLICATOR PROVIDING SECURITY FOR DISSIMILAR MULTIPLE PORTABLE COMPUTERS

FIELD OF THE INVENTION

The invention generally relates to the field of portable computers. More specifically, the invention relates to "port replicator" or "docking station" accessories for use with portable computers, which enable use of portable computers as replacements for desktop computers.

BACKGROUND OF THE INVENTION

Portable computers, colloquially referred to as "laptop" or "notebook" computers, have increased in power, speed, and memory capacity to the point where they offer functionality comparable to that of desktop-style personal computers. Accordingly, portable computers' features and accessories have been designed with suitable interfaces to allow a user to use the same large-size displays and full-size keyboards as would normally be used with a desktop machine. In particular, port replicators and docking stations have been developed, to hold all of the electrical connections between the keyboard, display, network connection, etc., with the computer.

Port replicators essentially are simple devices which couple peripherals to the computer through a computer interface connector. A port replicator may be enhanced with communication features such as local area network (LAN) interface cards. A docking station is more fully equipped, having desktop-like features such as CD-ROM drives. For the sake of the present specification, however, the terms will be used interchangeably.

Thus, all a user has to do is "dock" the portable computer with the docking station, and the computer is ready to directly interface with all of the peripherals.

One particular issue faced by docking station designers is that of portable computer security. Portable computers are attractive targets for theft, because of their small size and low weight. Accordingly, security measures have been used to hold a portable computer in the port replicator. The measures have included latches or other structures for securing the computer in place. A user either uses a key lock to release the computer, or follows a suitable shut-down procedure which is a prerequisite for release of the computer from the dock.

It will be understood that there must be physical and electrical compatibility between the portable computer and its docking station. However, portable computers vary considerably in size, configuration, etc., even within a given manufacturer's line.

Thus, conventionally it has been necessary for a portable computer manufacturer to provide either (i) a whole line of functionally identical but physically different docking stations, commensurate with its line of portable computers, (ii) a menagerie of adapters, or (iii) docking stations which are mechanically complex (and expensive) enough to accommodate all possible variations and permutations of portable computers and latching/locking mechanisms. Further, it has been necessary for the manufacturer to upgrade or modify the docking stations and/or adapters when the manufacturer develops a new model, or new line, of portable computers.

This multiplicity of different configurations has disadvantageously required manufacturers to many different models, instead of a more cost-efficient, higher-volume single model compatible with many different portable computer models. Design and manufacturing costs, as well as inventory controls and administrative costs, have been disadvantageously high.

What is needed, therefore, is a security system, for use with port replicators or docking stations, which secures a docked portable computer against theft, while providing cost-efficiency.

SUMMARY OF THE INVENTION

There is provided, in accordance with the invention, a security mechanism for use with portable equipment, such as a "notebook" type portable computer, which is to be coupled for use with stationary equipment, such as a port replicator or docking station. The invention has applicability to product lines, in which various models vary in size and shape. The security mechanism includes locking structures, located in complementary positions on the computer and the port replicator, for engaging each other to prevent theft by removal of the computer from the port replicator.

The locking structures are designed the same across the line of products, to provide easy compatibility and to avoid costly equipment upgrades. Specifically, the locking structures of the various computers within the line of products are in corresponding positions on the computers, relative to the positions the computers occupy when docked. Therefore, the locking structures engage the same way, regardless of which computer of the line of products is docked. Also, the mechanism of the invention provides convenient ease of use for the user, and is compatible with operating system or other software security prerequisites for undocking.

DETAILED DESCRIPTION OF THE PREFERRED EMBODIMENTS

The invention may be applied to a variety of types of equipment. For illustrative purposes, the discussion which follows will focus on the area of portable computers and docking stations.

In general, a piece of equipment and a docking module (herein also called a docking station or a port replicator) have interfacing surfaces which abut each other. Generally, the interfacing surface of the piece of equipment is its lower surface. The piece of equipment is moved or slid along the interfacing surface of the docking module to engage connectors for communication.

In the discussion which follows, a convention will be used, regarding the orientation of computers and port replicators. The conventions is predicated on the assumption that a typical user workstation will have a port replicator in front of the user.

Typically, the port replicator has as its interfacing surface a computer bed, and also has a docking surface, bearing a computer connector, on a side of the computer bed away from the user. The user docks the computer by setting it down on the bed, and pushing the computer away from him/her, toward the docking surface to couple the computer with the connector on the docking surface.

Accordingly, from the user's vantage point, motion of the computer toward the docking surface, for docking, is "forward" motion or "docking" motion. Likewise, "undocking" motion, away from the docking surface, is "backward" motion.

Additionally, the terms "front" and "back" will be used to refer to parts of the computer and the port replicator which are, respectively, close to, and away from, the user. Also, an "up" and "down" convention will be used, wherein the computer is above the port replicator, consistent with the user's perception in the configuration to be described.

While it is believed that this convention, in connection with the examples discussed below, will be helpful for comprehension of the invention, it will be understood that this description places no limitation of any sort on the spirit and scope of the invention. All other docking or undocking motion, and all computer or port replicator features which would facilitate such docking or undocking motions, also fall within the spirit and scope of the invention.

Figure 1:
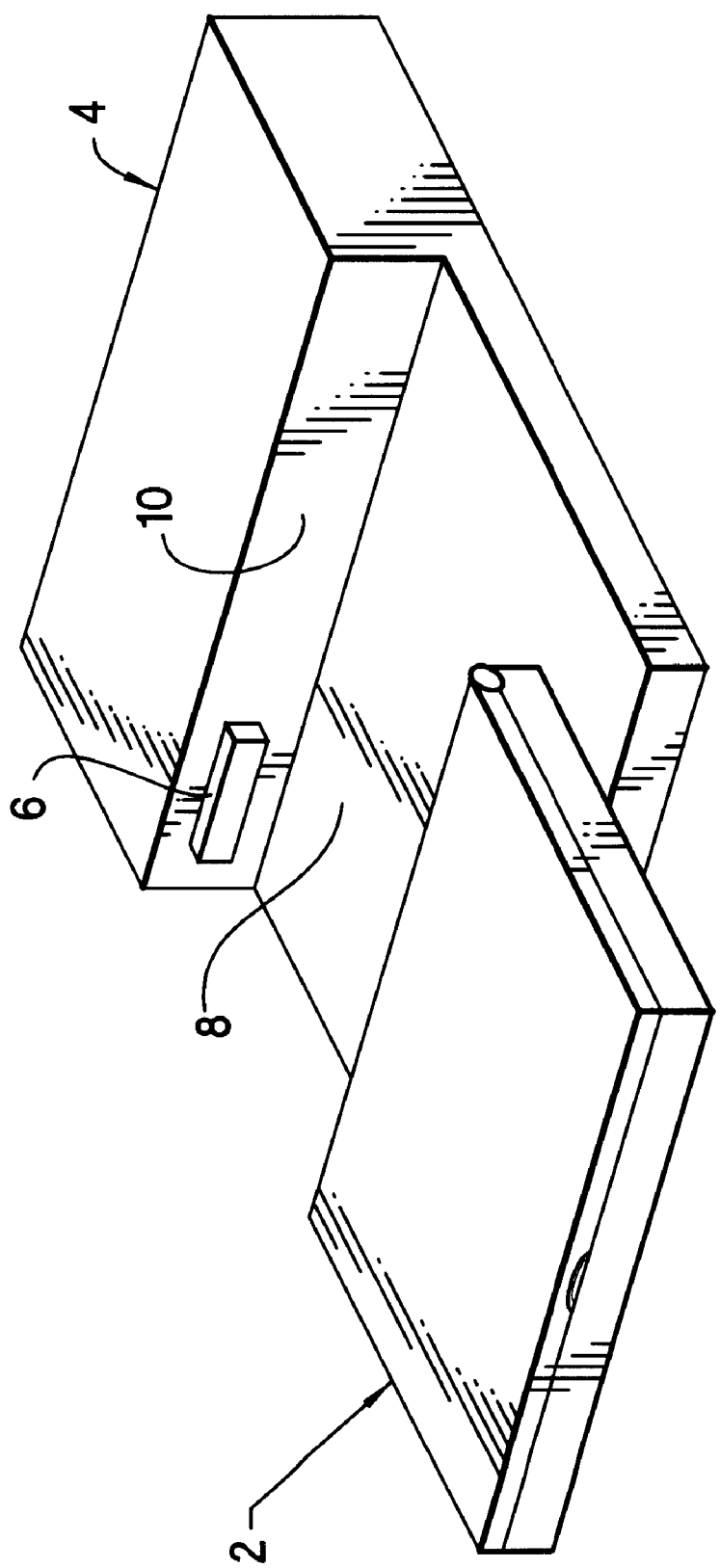
FIG. 1 is a perspective view showing a conventional port replicator and portable computer.

FIG. 1: A Conventional Port Replicator

FIG. 1 is a simplified perspective view of a portable computer 2 and a port replicator 4. The view is "exploded," in that the computer 2 is not docked with the port replicator 4. Accordingly, a connector 6 is visible on a docking surface 10 of the port replicator 4. A corresponding connector is positioned on a back surface of the computer 2. (Neither the back surface nor the connector are visible in this view. However, persons skilled in the portable computer design arts will be familiar with such connectors.)

To dock the computer 2 with the port replicator 4, simply place the computer 2 on a computer bed 8 of the port replicator 4, and slide the computer 2 forward, toward the docking surface 10, so as to engage the connector of the computer 2 with the connector 6.

Other pieces of equipment, such as peripheral devices (not shown), are coupled with the port replicator 4 so as to communicate with the computer 2 through the connector 6.

While the arrangement of FIG. 1 is well-suited for its function, it does not protect the computer 2 from theft. Rather, it is all too easy for a thief to detach the computer 2 and take it. Conventional locking apparatus, while effective, have been complex and costly, and have not been standardized.

Figure 2:
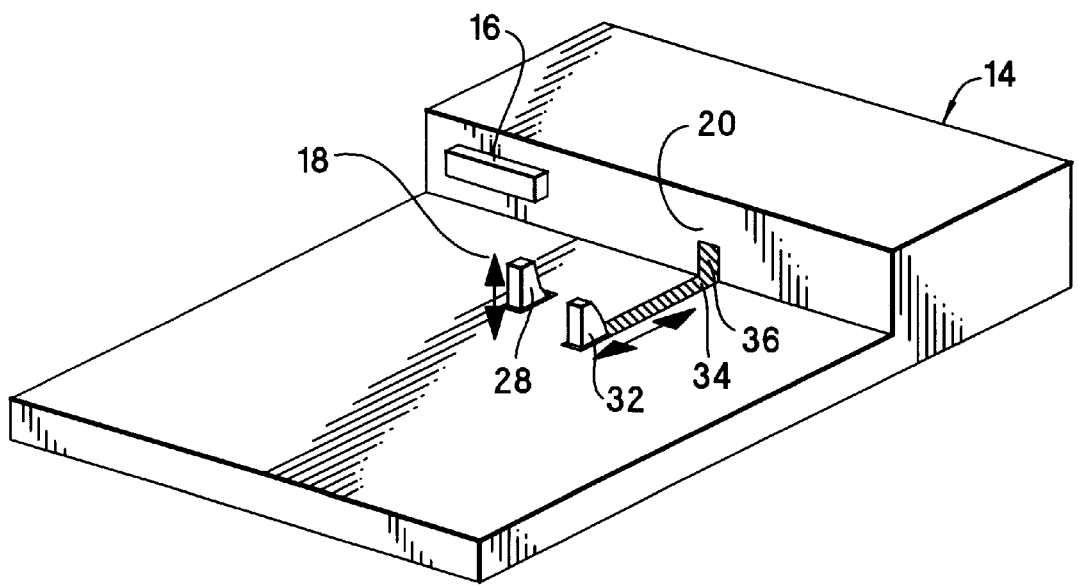
FIGS. 2 and 3 are perspective views showing, respectively, a port replicator and portable computer according to the invention.
Figure 3:
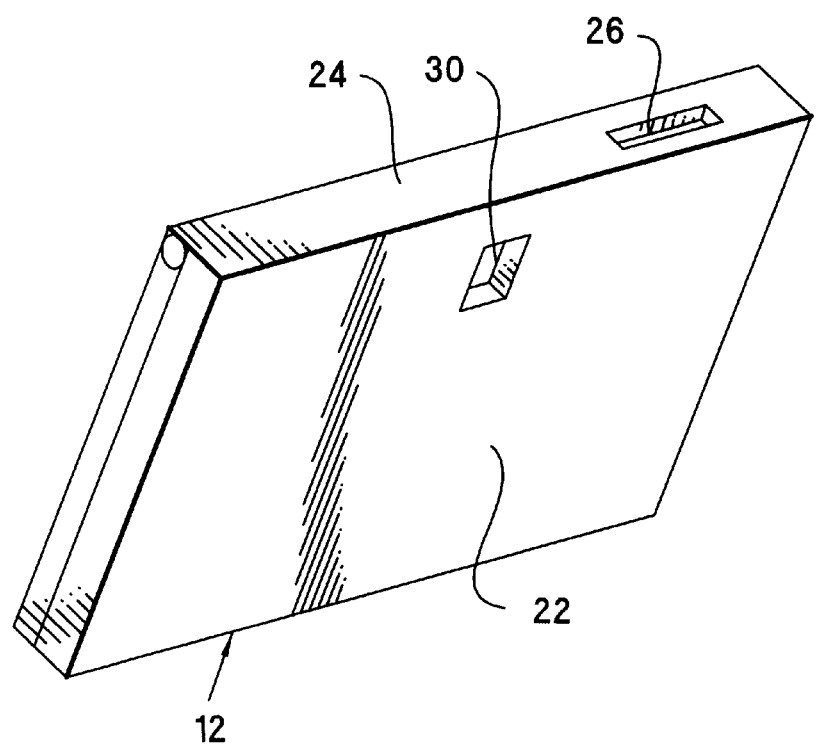

FIGS. 2 and 3: A Port Replicator Having a Locking Mechanism According to the Invention FIGS. 2 and 3 are perspective views of a computer 12 and a port replicator 14 according to the invention. A connector 16, a computer bed 18, and a docking surface 20, similar to the respective elements of the conventional port replicator 4, are shown on the port replicator 14.

The view of the computer 12 in FIG. 2 is similar to that of FIG. 1. In the view of FIG. 3, the computer 12 is rotated, so that predetermined surfaces of the computer 12, shown as its bottom surface 22 and its back surface 24, are visible. One of these predetermined surfaces, in this case the back surface 24, bears a connector 26 for engaging the connector 16.

When the computer 12 is to be docked with the port replicator 14, the computer 12 is placed on the port replicator 14 such that the bottom surface 22 and the bed 18 are in contact with each other. The bottom surface 22 and the bed 18 may be more broadly termed "interfacing surfaces," in that they interface with each other by coming into direct contact with each other. In other embodiments of the invention, the interfacing surfaces need not be horizontal or flat, but could have other orientations such as vertical, or could include structures such as tracks and grooves.

In accordance with the invention, a standardized locking apparatus is provided. Here, "standardized" means that the same apparatus is used over a set of different portable computer models, such as the models in a line of products such as Hewlett-Packard Company's "Omnibook" line of portable computers.

In general, the locking apparatus includes latching structures, complementary with each other, on interfacing surfaces of the computer 12 and the port replicator 14. The latching structures may be hooks which engage each other, a projection and a receptacle, or other suitable configurations.

In the illustrated embodiment, the locking apparatus of the port replicator includes a locking member, shown as a latch hook 28, positioned on the port replicator 14 at a position for engagement with the computer 12. Preferably the locking member of the port replicator 14 is disposed, as shown, on the computer bed 18.

On the interfacing surface of the computer 12, in this case the bottom surface 22, is located a locking apparatus, preferably a locking member receptacle. Here, the locking member receptacle is shown as a latch hook aperture 30 for engaging the latch hook 28.

In general, the complementary latching structures of the computer 12 and the port replicator 14 are located on their interfacing surfaces. In accordance with the invention, all of the different computer models making up the product line have their locking apparatus at the corresponding position on the interfacing (i.e., bottom) surfaces.

The latch hook 28 is located at a predetermined position on the port replicator 14, relative to that of the computer bed 18 and the connector 16. Accordingly, any portable computer can be compatible with the port replicator 14, as long as the surfaces of the portable computer, and a connector and a latch hook aperture thereon, have the same relative dimensions and positions.

It is commonplace for the docking and undocking process to involve a certain type of motion of the portable computer, relative to the port replicator. For instance, in the arrangement of FIG. 2, the portable computer 12 is placed on the port replicator 14, such that the bottom surface 22 rests on the computer bed 18, and the back surface 24 faces the docking surface 20. The connectors 16 and 26 are aligned by moving the computer 12, as necessary, in a translational motion parallel to the docking surface 20. Then, the computer 12 is docked by moving it directly toward the docking surface 20, translationally, so as to engage the connectors 16 and 26. This latter motion will be referred to as a "docking motion," and will be regarded as motion forward, as per the convention discussed above.

Once the computer is docked and the latch hook 28 engages the latch hook aperture 30, the computer 12 cannot be pulled back, translationally, away from the docking surface 20. The computer 12 also cannot be moved translationally, parallel to the docking surface 20. A thief's only recourse, then, is to try to tip the front of the computer 12 upward, rotationally, so that the computer 12 lifts up off the latch hook 28 while the back of the computer 12 rotates off the connector 16 without a great deal of translational motion that the latch hook 28 would prevent. In accordance with the invention, the latch hook 28, in combination with other design features of the port replicator 14, defeat this attempt and prevent the theft.

FIGS. 4, 5, 6, 7, and 8: Retracting the Latch Hook During Docking

In accordance with the invention, the locking apparatus must disengage for undocking by the user, and must not hinder the docking or undocking process. Thus, a mechanism is provided for engaging and disengaging the locking apparatus in the course of the docking and undocking processes. Preferably, the user need not take a separate action, such as operating a disengage lever, while he/she is docking or undocking the computer. Rather, in accordance with the invention the engaging and disengaging mechanism is operated responsive to the presence of the computer near the port replicator.

Referring again to the illustrated embodiment of FIG. 2, ordinary docking and undocking by the user is not to be hindered by the latch hook 28. Therefore, the docking and undocking process includes retraction of the latch hook 28. There are a variety of manual ways this can be done. However, in accordance with the invention, there is provided a mechanism for retracting the latch hook 28 automatically, in the course of docking and undocking.

A manipulation apparatus is provided to interface with the computer and to move, along with the docking movements of the computer. The manipulation apparatus causes the locking apparatus to move out of the way. Thus, the user is not required to manipulate the locking apparatus separately while docking the computer.

A preferred embodiment of the engaging and disengaging mechanism is shown in FIG. 2. A latch hook retraction pin 32 is positioned on the computer bed 18. The pin 32 is movable along a slot 34, by means of a guiding mechanism, which will be described in detail in connection with FIGS. 4, 5, 6, 7, and 8.

During the docking motion, the back surface 24 of the computer 12 engages the pin 32, and pushes the pin 32 along the slot 34, until, when the computer 12 has docked, the pin 32 is inside a shelter 36 in the docking surface 20 of the port replicator 14.

Figure 4:
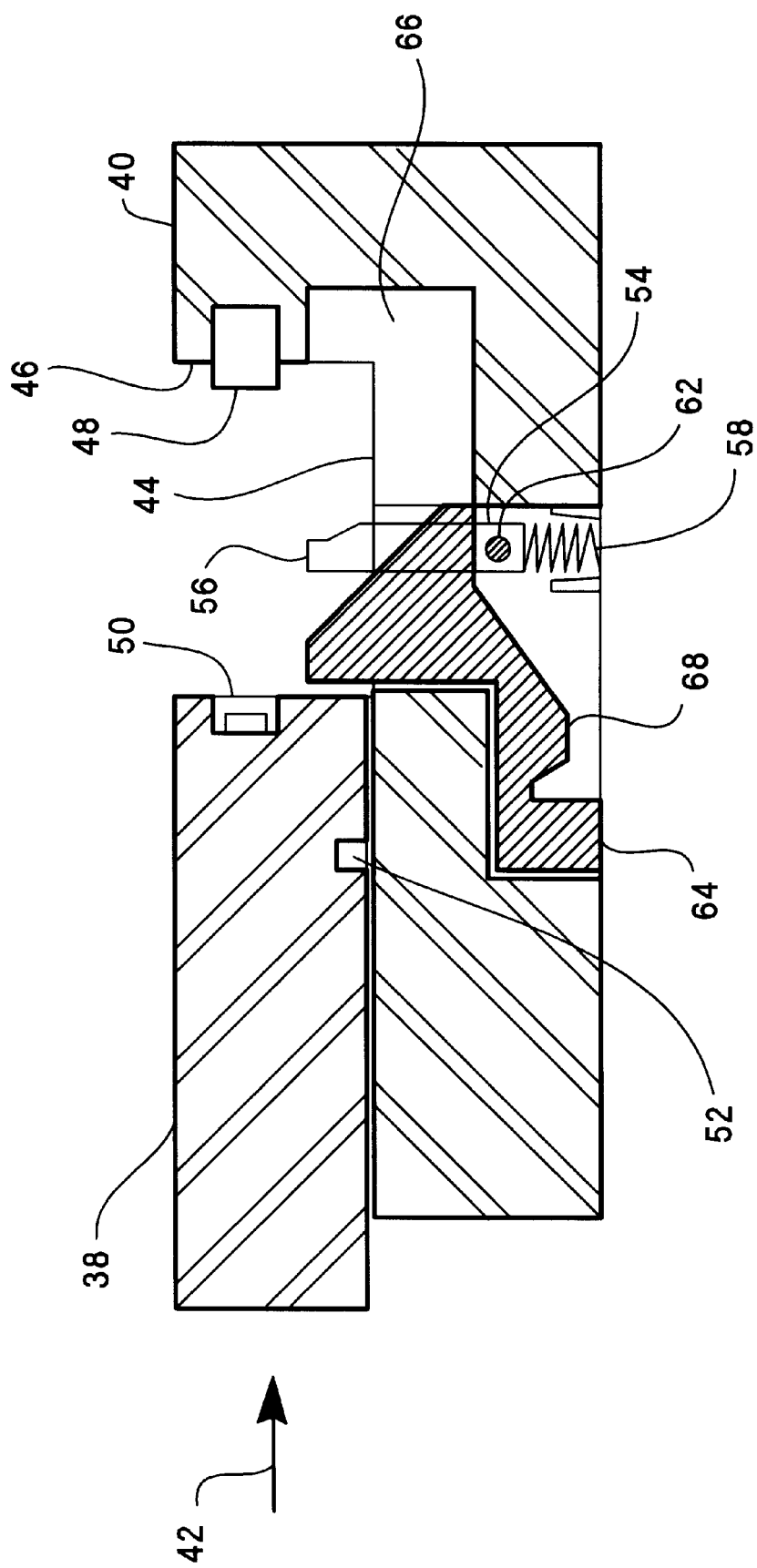
FIG. 4 is a cutaway side view showing a first stage in a docking procedure for the computer and port replicator of FIGS. 2 and 3.
Figure 5:
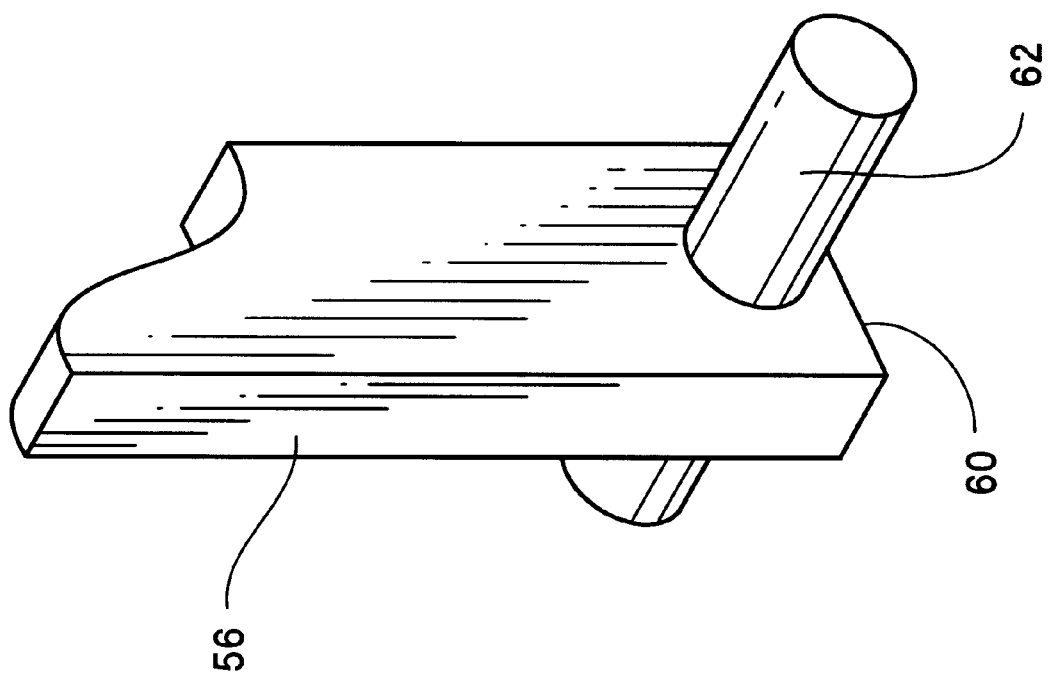
FIGS. 5 and 6 are detailed views of components of the port replicator of FIG. 4.
Figure 6:
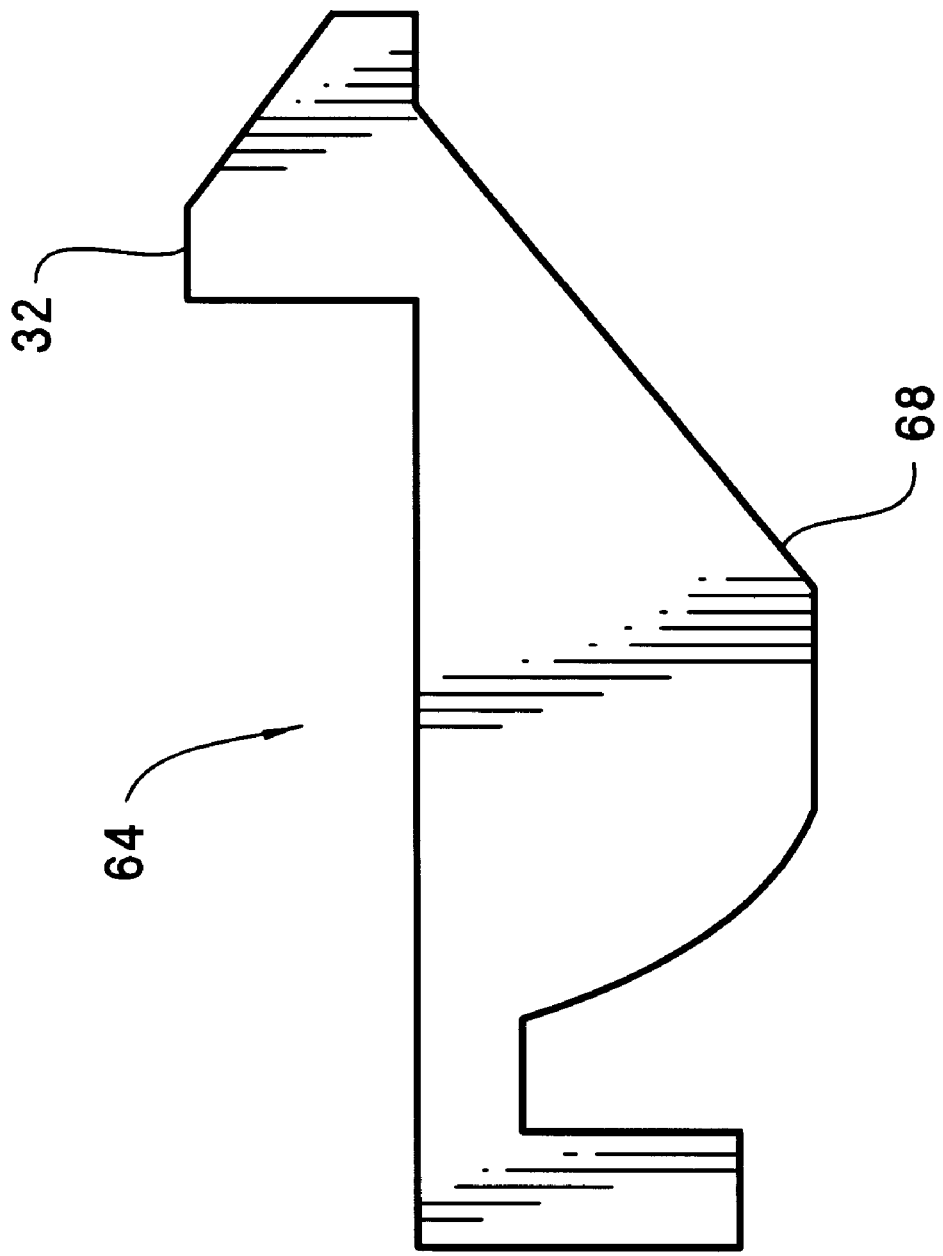
Figure 7:
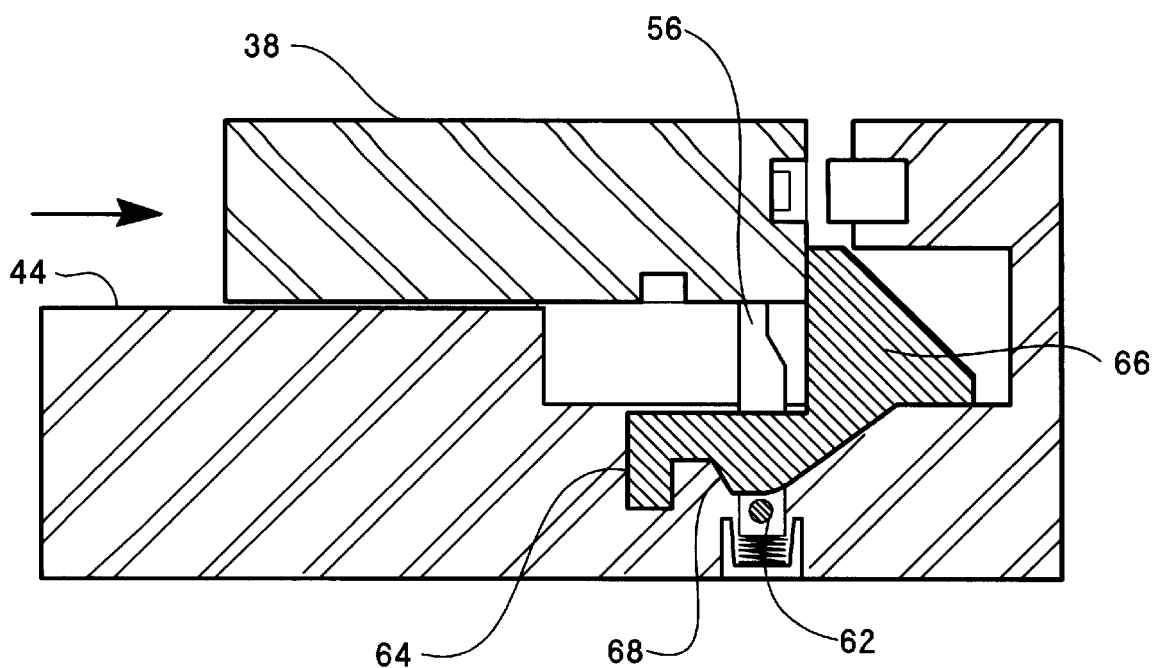
FIG. 7 is a cutaway side view showing a second stage in a docking procedure for the computer and port replicator of FIGS. 2 and 3.
Figure 8:
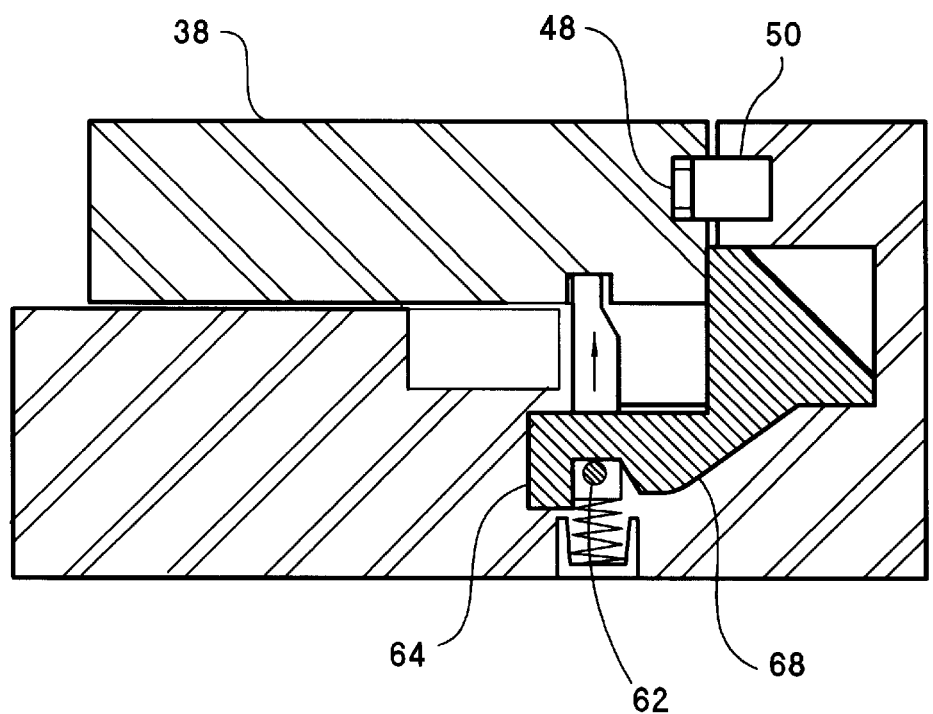
FIG. 8 is a cutaway side view showing a third stage in a docking procedure for the computer and port replicator of FIGS. 2 and 3.

The interaction of the pin 32 and the latch hook 28 will now be described, in connection with FIGS. 4, 5, 6, and 7. Three of these illustrations, FIGS. 4, 7, and 8, are cutaway side views, showing beginning, intermediate, and end stages of a docking procedure employing an apparatus according to the invention. The other illustrations, FIGS. 5 and 6, show detailed views of two components of the apparatus.

Let us first consider FIG. 4. A computer 38 is to dock with a port replicator 40. An arrow 42 represents a forward docking motion, such as the user pushing on the computer 38 so that the computer 38 slides on a computer bed 44 of the port replicator 40, toward a docking surface 46 having a connector 48, which will couple with a connector 50 of the computer 38. A latch hook aperture 52 is located on the underside of the computer 38.

Also shown in FIG. 4 is a latch hook apparatus 54 which supports a latch hook 56. The structure of the latch hook apparatus 54 will be described in detail in connection with FIG. 5, and then the docking operation will be described in terms of FIGS. 7 and 8.

The task at hand is to move the latch hook out of the way while the computer 38 is docking or undocking, and to move the latch hook 56 to engage the latch hook aperture 52 when the computer 38 is docked. In this embodiment, the latch hook apparatus 54 moves in a reciprocating manner, in this case up and down. When the latch hook 56 is up, it engages the latch hook aperture 52 of the docked computer 38. When the latch hook 56 is down, the computer 38 is free to make docking or undocking motions.

Known mechanical principles may be used for urging the latch hook 56 between the two positions. The latch hook apparatus 54 is preferably biased toward a first position, and subjected to a force which overcomes the bias. Specifically, the bias-overcoming force comes into play as the computer 38 is being docked or undocked. While just the opposite could be the case, it is deemed preferable that the bias position be the normal state, and the overcoming force be applied in the course of the docking procedure.

In the particular case of FIG. 4, a spring 58 serves as a bias member, for urging the latch hook apparatus 54 upward.

In FIG. 5, the latch hook apparatus 54 of the preferred embodiment is shown in detail. The latch hook 56 forms the top part of the latch hook apparatus 54. Only the latch hook 56 projects above the surface of the computer bed 44, as shown in FIG. 4. Bias force is exerted by the spring 58 against an underside surface 60 of the latch hook aperture 54.

The latch hook apparatus 54 also includes an engaging member, specifically a reciprocation guide member, shown as a rod 62. The rod 62 rides on a cam (described below) which receives the force that overcomes the bias of the spring 58.

FIG. 6 is a detailed illustration of a manipulation apparatus for automatically causing the latch hook 56 to move out of the way while docking. In the preferred embodiment, the manipulation apparatus is shown as a pin apparatus 64. The pin apparatus 64 is shown in isolation in FIG. 6, and is shown within the security apparatus in FIG. 4. The pin apparatus 64 is a single member in the preferred embodiment, but may alternatively be an assembly of discrete parts serving the functions to be described.

The pin 32, which engages the computer 38 as the computer 38 is being docked or undocked, is disposed on the pin apparatus 64. The pin apparatus 64 moves as the computer 38 is being docked or undocked. Preferably the pin apparatus 64 also moves between a first position urged by a bias force and a second position urged by a bias overcoming force. In the preferred embodiment, a spring bias (details omitted from the drawings), similar to the spring 58 of the latch hook apparatus 54, biases the pin apparatus to the position shown in FIGS. 2 and 4, in which the pin (32 in FIG. 2 or 56 in FIG. 4) is positioned out above the bed (18 in FIG. 2 or 44 in FIG. 4). It will be seen that, when the computer 38 is being docked, the computer pushed the pin (32 or 56) into the shelter (shown as 36 in FIG. 2, and as 66 in FIG. 4). Preferably, the pin apparatus 64 moves along a track (details not shown), which suitably restricts its movements.

The pin apparatus 64 also includes an engaging structure for engaging a complementary engaging structure of the latch hook apparatus 54 and causing the latch hook apparatus 54 to move as the pin apparatus 64 moves. In this preferred embodiment, the engaging structure of the latch hook apparatus 54 includes the rod 62, previously discussed. The engaging structure of the pin apparatus 64 is shown as a cam 68. The rod 62 engages the cam 68. Thus, the latch hook apparatus 54 moves as the pin apparatus 64 moves. This will be illustrated in detail in FIGS. 7 and 8.

As the computer 38 is moved in a docking motion (to the right, as per the arrow 42 of FIG. 4), the rod 62 and the cam 68 engage to produce the state shown in FIG. 7. Here, the cam 68 includes a high-displacement region which engages the rod 62 to overcome the bias force of the spring 58 and displace the latch hook apparatus 54 downward, below the surface of the bed 44. Thus, the latch hook 56 is moved out of the way while the computer 38 is being docked.

Finally, when docking is completed, the situation shown in FIG. 8 is reached. here, the rod 62 has ridden past the high-displacement region of the cam 68, and reached a low-displacement region of the cam 68. Here, the bias force of the spring 58 is no longer overcome by the cam 68, and the latch hook apparatus is free to return to its upward position. Thus, the latch hook 56 engages the latch hook aperture 52, and the computer 38 is held securely. (It will be observed, also, that the connectors 48 and 50 are engaged for docking.)

When the computer 38 is to be undocked, the reverse takes place. As the computer 38 moves in an undocking motion (e.g., to the left as viewed in FIGS. 4, 7, and 8), the rod 62 again rides the cam 68 to the high displacement region, and the latch hook 56 is pulled out of the way. Thus, the computer 38 is released.

It will be understood that, in accordance with known principles of computer or operating system design, additional prerequisites, such as a software shut-down or a software password, are required for undocking the computer 38. The security mechanism here described operates suitably in accordance with any such other prerequisites. For instance, additional apparatus within the port replicator 14, not shown, are used to prevent unauthorized undocking, for instance by not allowing the pin mechanism 64 to move from the docked position unless the prerequisites are met.

Conclusion

It will be seen from the detailed description given above, that a security mechanism in accordance with the invention advantageously prevents unauthorized personnel, such as thieves, from taking a docked portable computer. The security mechanism of the invention may be used across a line of different portable computer products, simply by designing compatible locking mechanisms across the line of products. For instance, an entire line of portable computer products may use the embodiment of FIGS. 2–8, simply by designing all of the computers to have latch hook apertures in corresponding positions on their bottom surfaces, relative to their respective back surfaces and connectors.

The security mechanism also provides advantageous ease of use for the user, because it operates because of the presence of the computer, and does not require the user to manipulate the security mechanism separately from docking the computer.

What is claimed is:

1. A security mechanism, comprising:

a piece of portable equipment, selected from a set of pieces of portable equipment;

a docking module for docking with any one of the set of pieces of portable equipment;

a locking member disposed on the docking module at a predetermined location thereon for engaging and disengaging the piece of portable equipment;

a locking apparatus disposed on the piece of portable equipment, wherein each of the pieces of portable equipment from the set has a locking apparatus at a standard location thereon, for engaging the locking member of the docking module; and a manipulation apparatus disposed on the docking module, manipulable concurrently with docking the piece of portable equipment to the docking module, the manipulation apparatus being coupled to the locking member for automatically causing the locking member to engage the piece of portable equipment when the piece of portable equipment has docked with the docking module and to automatically move out of the way of the piece of portable equipment while docking or undocking wherein a user is not required to manipulate the locking apparatus separately while docking the computer.

2. A security mechanism as recited in claim 1, wherein:

the docking module and the piece of portable equipment each have an interfacing surface, the interfacing surface meeting each other when the piece of equipment docks with the docking module;

the locking member is disposed on the interfacing surface of the docking module; and the locking apparatus is disposed on the interfacing surface of the piece of portable equipment, the standard location of the piece of portable equipment facing the locking member to engage therewith.

3. A security mechanism as recited in claim 2, wherein:

the locking apparatus of the piece of portable equipment includes a locking member receptacle on the interfacing surface of the piece of portable equipment; and the locking member is movable to extend from, or retreat within, the interfacing surface of the docking module.

* * * * *